Patented May 15, 1945

2,375,874

UNITED STATES PATENT OFFICE 2,375,874

STEROL AND STEROID DERIVATIVES

Hans R. Rosenberg and Stockton G. Turnbull, Jr., Wilmington, Del., assignors to E. I. du Pont de Nemours & Company, Wilmington, Del., a corporation of Delaware No Drawing. Application August 17, 1943, Serial No. 498,986

5 Claims. (Cl. 260—397.2)

This invention relates to new and important sterol and steroid derivatives and processes for their production and use. More particularly it refers to thiourea derivatives of cholesterol and related sterols and processes for their production and employment in the industrial arts.

It is an object of this invention to produce new sterol and steroid derivatives containing sulfur in the molecule. A further object is to produce thiourea derivatives of sterols and steroids. A still further object is to produce thiourea derivatives of cholesterol and related materials which are of value in the industrial arts and particularly in the production of therapeutically effective compositions. A still further object is to produce the foregoing and related compounds by processes which are simple and inexpensive. A still further object is to employ the foregoing and related compounds in the production of other compounds having appreciable value in the pharmaceutical industry. Additional objects will become apparent from the following description and claims.

These objects are obtained in accordance with the herein described invention wherein sterol and steroid derivatives containing one or more halogen groups are reacted with thiourea to produce thiourea derivatives of the parent compound. In a more restricted sense this invention is concerned with the reaction of a cholesterol halide, or related sterol or steroid compound, with thiourea in the presence of an insert solvent. In a still more restricted sense this invention pertains to the reaction of cholesterol bromide or a related sterol derivative with thiourea, particularly in the presence of hydroxylated solvents such as isopropanol. Other embodiments of the invention are concerned with the new thiourea derivatives produced by the foregoing and related reactions. Still further embodiments of the invention concern the employment of these new thiourea derivatives in the manufacture of pharmaceutical and other products.

The invention may be more readily understood by a consideration of the following illustrative examples wherein the quantities are given in parts by weight.

EXAMPLE 1

Cholesterol-S-pseudothiourea hydrohalides 583 parts by weight of chloesteryl bromide and 119 parts of thiourea were dissolved by warming in 1500 parts of isopropanol. The solution was heated with agitation at reflux temperature over a period of 88 hours. The hydrobromide commenced to crystallize from a solution after 16 hours as a white solid. Upon completion of the heating period the reaction mixture was cooled and the product was filtered off. It was purified by slurrying successively with warm ethyl ether and water which respectively removed unchanged cholesterol bromide and thiourea.

When pure, this new chloesterol derivative with the formula

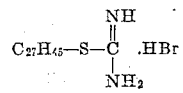

melted at 250–252° C. It is somewhat soluble in warm isopropanol, but insoluble for the most part in water and organic solvents such as ether, benzene, etc.

Calc. for $C_{28}H_{49}N_2SBr$: C, 64.00; H, 9.38; N, 5.34; S, 6.10. Found: C, 64.37; H, 9.05; N, 5.89; S, 5.63.

By condensation of cholesteryl chloride with thiourea in isoamyl alcohol the cholesterol-S-pseudothiourea hydrochloride was obtained. It melted at 253–254° C.

EXAMPLE 2

Hydrolysis of cholesterol-S-pseudothiourea hydrobromide 23 parts of cholesterol-S-pseudothiourea hydrobromide in 500 parts of isopropanol was heated under nitrogen with a solution of 2.65 parts of potassium hydroxide in 250 parts of water at reflux for 24 hours. The oil that settled was extracted into ether. The aqueous layer was removed and the ether layer was repeatedly washed with water to free it of isopropanol. After drying over sodium sulfate and concentration there was obtained an oil. This crystallized from ethyl acetate and gave the thiocholesterol of melting point 99.5° C. described by Wagner-Jauregg, Ber. 74, 27 (1941).

EXAMPLE 3

34 parts of cholesterol-S-pseudothiourea hydrobromide was heated while dissolved in 500 parts of a mixture of 25 parts piperidine and 475 parts alcohol. After two hours at reflux, the reaction mixture was poured into water and extracted into ether. After several washes with dilute hydrochloric acid, the ether layer was dried and concentrated to obtain 13 parts of purified thiocholesterol.

EXAMPLE 4

27 parts of cholesterol-S-pseudothiourea hydrobromide was added to a warm solution of 13 parts of $Na_2S.9H_2O$ and 10 parts of piperidine in 1000 parts of alcohol and the mixture was heated under nitrogen at a gentle reflux for three hours. The mixture was then poured into water and extracted into ether which gave 17 parts of a pink oil that crystallized upon standing. When recrystallized from a mixture of ethyl acetate and alcohol, the thiocholesterol was obtained in relatively pure condition.

EXAMPLE 5

*Thiocholesterol acetate*

To 108 parts of cholesterol-S-pseudothiourea hydrobromide there was added a solution of 7.2 parts of $Na_2S.9H_2O$ and 35 parts of piperidine in 3000 parts of alcohol. The mixture was held at a gentle reflux under nitrogen for 16 hours and was then poured into water. The product was extracted into ether and freed of alcohol and piperidine by repeated washes with dilute hydrochloric acid. Concentration of the dried ethereal solution gave an oil which solidified. This was triturated with ethyl acetate, whereupon the thiocholesterol dissolved and there remained on filtration impure dichloesteryl disulfide,

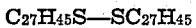

$$C_{27}H_{45}S—SC_{27}H_{45}$$

which melted at 144–146 C. when pure.

The impure thiocholesterol obtained as an oil by concentration of the above ethyl acetate solution was heated at 140° C. with 200 parts of acetic anhydride for 16 hours. The acetic anhydride was removed by heating under vacuum, and the thiocholesterol acetate that remained was purified by recrystallization from ethyl methyl ketone. It melts at 102–104° C. and is soluble in benzene, ethyl acetate, chloroform and ether, while only slightly soluble in cold methanol, ethanol and acetone.

Calc. for $C_{29}H_{48}OS$: C, 78.35; H, 10.86; S, 7.2. Found: C, 78.58; H, 10.71; S, 7.13.

EXAMPLE 6

*Thiocholesterol benzoate*

3.0 parts of thiocholesterol was dissolved by warming in 40 parts of pyridine. The solution was cooled and treated with 5 parts of benzoyl chloride. After standing for two days, the mixture was poured into ice water and the crystalline benzoate was filtered and washed with cold methanol. Upon recrystallization from ethyl acetate the thiocholesterol benzoate was obtained. It sinters slightly at 125° C., melts at 150° C. to a cloudy liquid and becomes clear at 161° C.

Calc. for $C_{34}H_{50}OS$: C, 80.63; H, 9.88; S, 6.32. Found: C, 80.04; H, 9.65; S, 6.75.

EXAMPLE 7

*Hydrolysis of the thiocholesterol acetate*

To 100 parts of alcohol there was added 1 part of piperidine and 1.8 parts of $Na_2S.9H_2O$. The mixture was heated to reflux under nitrogen to dissolve the sodium sulfide and was then cooled and 2.7 parts of thiocholesterol acetate was added. After heating at reflux under nitrogen for 1.5 hours, the solution was filtered while warm from the 0.57 part of dicholesteryl disulfide that had formed. The alcoholic filtrate was dissolved in ether and the mixture was washed several times with water. Upon drying over sodium sulfate and concentration, there was obtained 0.06 part of dicholesteryl disulfide and 1 part of thiocholesterol which was purified by recrystallization from ethanol.

It is to be understood that the foregoing examples are representative merely of a few of the many practical embodiments of this invention. They may be varied widely with respect to the individual reactions, the amounts thereof and the conditions of reaction without departing from the scope hereof.

In place of cholesteryl bromide, referred to in Example 1, it is possible to use halides of other sterols and steroids. For example, halides of sterols such as ergosterol, stigmasterol, sitosterol, campesterol, sterols obtained from mussels and other invertebrate animals, ostreasterol, etc., may be used. In the same manner, halides of steroids such as cholic acid, androsterone, testosterone, steroid digitonides, estrone, estriol, equilenin, and the like, may be employed. It is to be understood that this invention contemplates the use of one or more sterols and/or steroids in the production of the desired products. By the selection of a suitable mixture of such materials, products having desirable and otherwise unattainable properties may be produced.

In place of the bromide derivative referred to in Example 1, other halides may be employed; for instance, the chlorides and the iodides. The same or different halides may be used and one or more of them may be present on the sterol and/or steroid compound. Likewise, these halides may be present on any portion of the parent molecule, depending upon the particular thiourea derivative which it is desired to produce.

The foregoing and related sterol and/or steroid derivatives are reacted with thiourea. This reaction is advisably carried out in the presence of an inert solvent. This solvent is advisably, but not necessarily, a hydroxylated material such as ethanol, n-butanol, isoamyl alcohol, and the like. In general, any inert solvent in which both the sterol or steroid halide and the thiourea are appreciably soluble may be used. For optimum results over a wide range of conditions and with a great number of reactants it is preferable to use isopropanol.

The reaction illustrated in Example 1 may be carried out at elevated temperatures and under pressure, if desired. This will result in a decrease in the time necessary to complete the reaction.

The proportions of reactants, as previously mentioned, may vary widely. For example, more thiourea proportionately may be used than was referred to in the case of Example 1. An increase in this reactant will ordinarily result in a decreased reaction time. It sometimes has, however, the disadvantage that the final product may be more difficult to purify.

The thiourea derivatives described heretofore may be readily and economically converted into other products having importance in the pharmaceutical and related industries. A few of the possible uses of these compounds and the manner in which they are produced and employed are referred to in Examples 2 to 7. These thiourea derivatives may be reacted with silver salts such as silver sulfate, silver nitrate, silver acetate, etc., to give the corresponding pseudothiourea salts of sulfuric, nitric, acetic, etc. acids. Salts of this latter type have many uses, including their employment as intermediates in the production of other compounds.

By means of the present invention a new class of important sterol and steroid derivatives has been produced. These products are produced in a simple and inexpensive manner. They have a multiplicity of uses in the industrial arts and particularly in the pharmaceutical and related industries. By means of them new vitamins, hormones, etc., of appreciable importance may be readily obtained.

As many widely different embodiments of this invention may be made without departing from the spirit and scope thereof, it is to be understood that the invention is not limited to the specific embodiments thereof except as defined in the appended claims.

We claim:

1. Cholesterol-S-pseudo-thiourea hydrohalide.
2. Cholesterol - S - pseudo-thiourea hydrobromide.
3. A process for producing a sterol-S-pseudo-thiourea hydrohalide which comprises heating a steryl halide with thiourea in the presence of a solvent.
4. A process for producing cholesterol-S-pseudo-thiourea hydrohalide which comprises reacting a cholesteryl halide with thiourea in the presence of an inert solvent for the reactants.
5. A process for producing cholesterol-S-pseudo-thiourea hydrobromide which comprises reacting cholesteryl bromide with thiourea in the presence of isopropanol.

HANS R. ROSENBERG.
STOCKTON G. TURNBULL, Jr.